Figure 1:
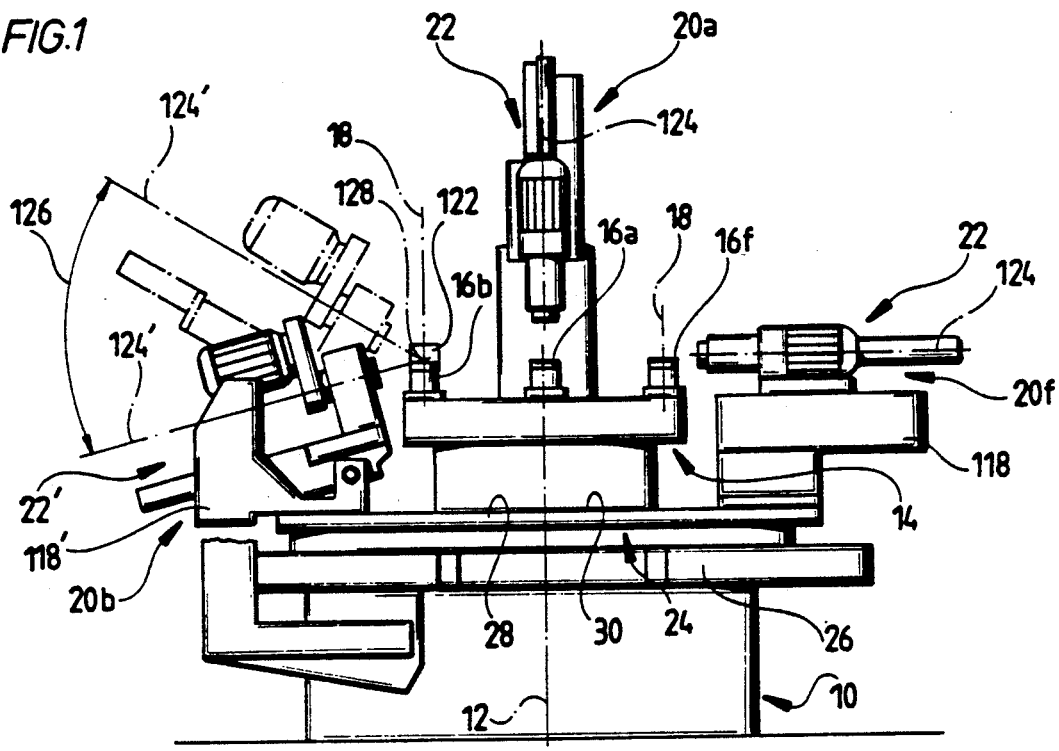

United States Patent [19]
Klett et al.

[11] Patent Number: 5,090,100
[45] Date of Patent: Feb. 25, 1992

[54] MACHINE TOOL WITH A ROTARY TABLE AND ROTATABLE HOLDING DEVICES

[75] Inventors: Manfred Klett, Freiberg; Markus Dreimann; Dieter Baumer, both of Leonberg, all of Fed. Rep. of Germany

[73] Assignee: Hahn & Kolb GmbH & Co., Fed. Rep. of Germany

[21] Appl. No.: 551,530

[22] Filed: Jul. 11, 1990

[30] Foreign Application Priority Data

Jul. 14, 1989 [DE] Fed. Rep. of Germany ....... 3923230

[51] Int. Cl.$^5$ .......................... B23B 9/12; B23Q 39/04
[52] U.S. Cl. ........................................ 29/38 C; 74/820
[58] Field of Search ............. 74/820, 813 L; 29/38 A, 29/38 B, 38 C; 409/158, 161; 82/129

[56] References Cited

U.S. PATENT DOCUMENTS 3,835,527 9/1974 Cornair ............................... 29/560

FOREIGN PATENT DOCUMENTS

| 877397 | 5/1953 | Fed. Rep. of Germany . |
| 2307494 | 8/1973 | Fed. Rep. of Germany . |
| 0156761 | 9/1983 | Japan ................................... 74/820 |
| 0206368 | 12/1983 | Japan ................................... 74/813 L |
| 1496097 | 12/1977 | United Kingdom ................. 74/820 |

OTHER PUBLICATIONS

Brochure: "Multifactor 50", Mikron Haesler.

Primary Examiner—Z. R. Bilinsky
Attorney, Agent, or Firm—Barry R. Lipsitz

[57] ABSTRACT

To so improve a machine tool comprising a machine frame, a rotary table mounted on the machine frame for rotation about a center axis, machining stations arranged around the rotary table, at least one holding device mounted on the rotary table for rotation about an axis of rotation, and a rotary drive, that during rotation of the rotary table from machining station to machining station, rotation of the holding device through optionally small or optionally large angles is possible, it is proposed that the rotary drive comprise a first and a second cam track held stationarily on the machine frame and a first and a second cam element mounted on the rotary table so as to move along the cam track as the rotary table rotates, that the first cam track be located in a first surface and the second cam track in a second surface, and that the first and second cam elements be coupled for rotating the holding device and in each of their positions along the cam tracks hold the holding device in a clearly defined rotary position.

38 Claims, 4 Drawing Sheets

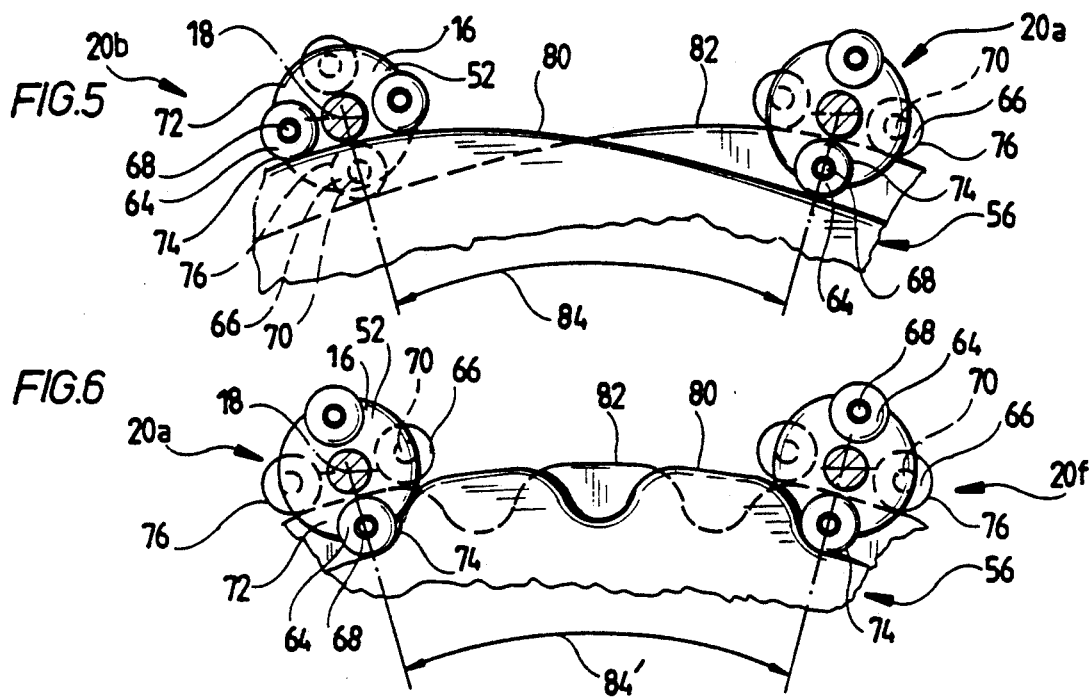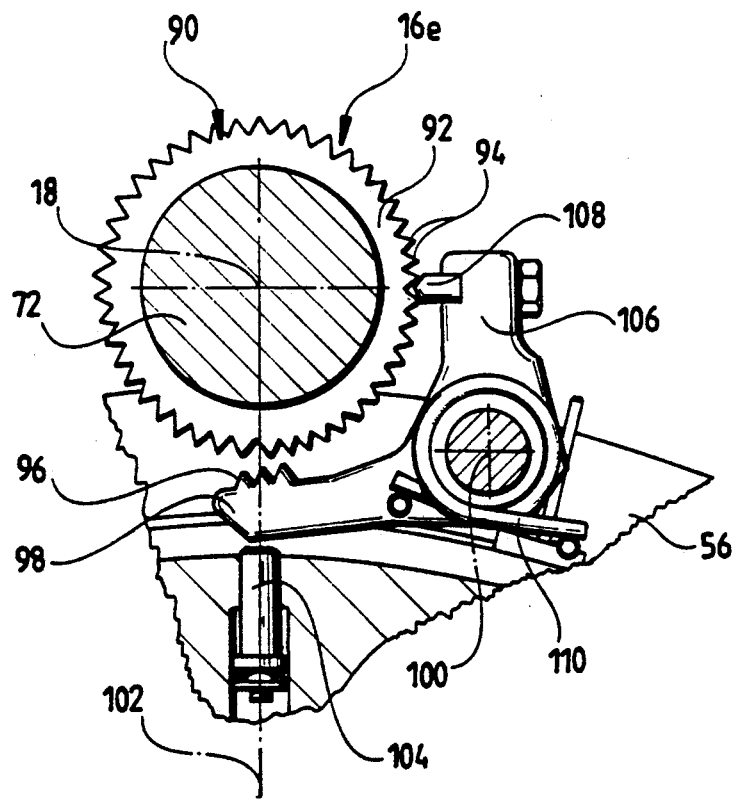

MACHINE TOOL WITH A ROTARY TABLE AND ROTATABLE HOLDING DEVICES

The invention relates to a machine tool comprising a machine frame, a rotary table mounted on the machine frame for rotation about a center axis, machining stations arranged at angular spacings around the rotary table, at least one holding device mounted on the rotary table for rotation about an axis of rotation and adapted to be brought into the machining stations by rotation of the rotary table, and a rotary drive for rotating the holding devices into various rotary positions.

Such a machine tool is known from the prior art. Herein, the holding device is driven via a pinion which engages a toothed segment. The toothed segment differs in length in accordance with the rotary position of the holding device that is to be attained. The disadvantage of this drive for the holding devices is that considerable impact stress acts on the pinion as it engages the toothed segment and, therefore, the rotary table cannot be rotated at a high speed.

The object underlying the invention is, therefore, to so improve a rotary table of the generic kind that the rotary table can be rotated at as high a speed as possible, and independently thereof, during the rotation of the rotary table from machining station to machining station, rotation of the holding device through optionally small or optionally large angles is possible.

This object is accomplished in accordance with the invention in a machine tool of the kind described at the beginning in that the rotary drive comprises a first and a second cam track held stationarily on the machine frame and a first and a second cam element mounted on the rotary table so as to move along the cam track as the rotary table rotates, in that the first cam track is located in a first surface and the second cam track in a second surface, in that the first cam track cooperates with a first cam surface of the first cam element and the second cam track with a second cam surface of the second cam element in constant contact with one another, in that the first and the second cam elements are coupled for rotating the holding device and in each of their positions along the cam tracks hold the holding device in a clearly defined rotary position, and in that the cam elements and the cam tracks are arranged such that the one cam element has access to its cam track without coming into contact with the cam track of the other cam element or with its access to this cam track.

The advantage of the inventive solution is that owing to the use of cam tracks instead of toothed segments, these can be designed so as to eliminate impact stress as the cam tracks make it possible for the rotary motions of the holding device to be initiated with the desired acceleration and hence not all of a sudden.

In particular the fact that the one cam element has access to its cam track without coming into contact with the cam track of the other cam element or with its access to this cam track ensures that the first cam track can be sensed by the first cam element and the second cam track by the second cam element independently of one another and, therefore, defined guidance of each individual cam element on the respective cam track and, consequently, also definite fixing of the rotary position of the holding device are possible.

It has proven particularly advantageous within the scope of the present invention for the first and second surfaces to extend parallel to each other. In the simplest case, the first and second surfaces lie in one plane. In this connection, it is, however, particularly advantageous for the first and second surfaces to be arranged in superimposed relationship.

Regarding the axes about which the cam elements rotate, it is particularly advantageous for the first and second cam elements to rotate about axes standing perpendicularly on the first and second surfaces, respectively.

The axes are preferably multiple rotational symmetry axes for the respective cam element.

The symmetry of the cam element may be multiple. It is, however, particularly expedient for the axis to be a twofold rotational symmetry axis for the respective cam element.

Particularly for reasons of simplicity, it has proven advantageous for the first and second cam elements to exhibit identical symmetry characteristics.

The cam elements may, for example, be arranged such that their axes extend parallel and in spaced relation to one another. A structural solution is, however, particularly simple and expedient wherein the cam elements are seated on one drive part only of the rotary drive. In particular, to ensure independent access of the individual cam elements to the cam tracks, it has proven expedient for the cam elements to be spaced from one another in the axial direction of the drive part.

Regarding the arrangement of the cam elements relative to one another, in order to ensure that the rotary position of the holding device is clearly defined, it is most advantageous for the cam elements to be arranged in offset relationship to one another on the drive part. In particular, it is expedient for the cam elements to be offset in relation to one another on the drive part so as to fill gaps therebetween, and in the case of cam elements with a twofold symmetry axis, an offset through 90 degrees is preferred.

In principle, the cam elements may be of any design. It is possible for the cam elements to comprise one cam body only which runs on the cam tracks. In connection with the running characteristics, it is, however, particularly expedient for the cam elements to run with rollers on the associated cam tracks.

In the description of the embodiments so far, no details have been given as to how the cam tracks are to be designed. It is particularly advantageous for the cam tracks to extend concentrically about the center axis. In the simplest case of an inventive machine tool, the cam tracks run around the center axis.

The cam tracks could be designed such that the cam elements are guided and enclosed between two guiding surfaces. In a solution which is preferred from a structural viewpoint, the cam tracks extend on one side of the cam elements, preferably on the side thereof facing the center axis and hence rest constantly against the cam elements on one side only.

To enable simple exchange of the cam tracks, provision is made for the cam tracks to be divided up into angular segments extending from one machining station to the next machining station. The arc length of the angular segments of the cam tracks and hence also the angular spacing of successive machining stations are preferably of such dimensions that the arc length corresponds to at least half of the circumference of the cam elements that rolls on the cam tracks. It is even better for the arc length to correspond to at least one such circumference that rolls on the cam track.

For particularly advantageous design of the inventive machine tool, the cam elements rotate the holding device through different angles of rotation during travel through different angular segments and so depending on the type of the individual machining station, a different rotary position of the holding device is possible from machining station to machining station.

In this connection, it is particularly expedient for the cam elements to rotate the rotary shaft during travel through one angular segment by an n-th multiple of an angular increment, this angular increment representing the smallest angular unit through which rotation of the cam element is possible.

In particular when high accelerations of the rotary table and hence rapid rotation thereof are to be brought about, it has proven expedient for the cam tracks to be designed such that the cam elements rotate the drive shaft during the entire travel through an angular segment for in this case the angular acceleration of the holding device can be kept to a minimum as the entire angular segment is available for further rotation of the holding device.

The cam tracks can be designed in a particularly simple and expedient manner by the rotary drive establishing during travel through each angular segment a constant transmission ratio between a rotation of the rotary table and of the holding device as the cam tracks within each angular segment can then be designed as section of a periodic series of curves, and it is readily possible to choose different transmission ratios in individual angular segments in order to rotate the holding device in the different angular segments through different angles of rotation.

So far, no further details have been given as to the shape of the cam tracks. In particular, in the case of cam elements with a twofold symmetry axis which are offset through 90 degrees in relation to one another, it is advantageous for the cam tracks to be designed such that in regions of their minimum spacing from an axis of the respective cam element, they support this cam element at two points spaced along the cam track, whereas the respective other cam element rests at one point against the other cam track which exhibits the maximum spacing from the axis of the other cam element. This ensures that the clearly defined rotary position of the holding device is defined by the one cam element resting at two points on the cam track, as the other cam element which rests against the other cam track with maximum spacing from the axis of rotation thereof could not define a definite rotary position of the holding device.

In a preferred embodiment of the inventive solution, provision is made for the cam elements to be designed such that with correspondingly designed cam tracks, rotation of the holding device within the range of from 0 degrees to at least 360 degrees is possible.

It is, furthermore, expedient for the cam elements to rotate the rotary shaft in one direction only during travel on the cam tracks.

To enable completely different machining cycles to be carried out with the inventive machine tool, provision is made in one embodiment for the cam tracks to be held exchangeably on the machine frame. It is particularly advantageous for the first and second cam tracks to be held individually on the machine frame so these can be exchanged without having to exchange the holding device and the cam elements associated with it.

Conversion of an inventive machine tool can be carried out in a very simple way when the cam tracks are divided up into track segments corresponding to the angular segments.

As supplementation to the present machine tool according to the invention, it has proven particularly advantageous for the holding device to be provided with an indexing device with which the holding device is fixable in a plurality of rotary positions which are defined by a multiple of an angular increment. This angular increment is, for example, 7.5 degrees. The advantage of such an indexing device is that the rotary drive for the holding devices can be of less precise design and yet a precisely defined rotary position of the holding device is always attainable in the respective machining position.

This indexing device is expediently designed so as to comprise an indexing ring which is rotationally fixedly connected with the holding device and cooperates with a indexing detent means held on the rotary drive.

The indexing detent means is advantageously a lever with a detent nose which is acted upon by a spring for engagement with the indexing ring. In particular, provision is made for the detent nose to effect a prefixing of the holding device in its respective rotary position.

In addition, it is expedient for the indexing device to comprise a means for exact positioning of the holding device in the machining stations.

This means for exact positioning expediently comprises positioning claws which can be brought into engagement with the indexing ring. In a particularly preferred solution, provision is made for the positioning claws to be engageable with the indexing ring in a machine-controlled manner. By the term "machine-controlled" it is to be understood that the controlling of the positioning claws is carried out directly with the controlling which is responsible for controlling the rotary table and that release or engagement of the positioning claws does not occur only via a rotary motion of the rotary table.

In a particularly preferred variant of the inventive machine tool, provision is made for the positioning claws to be brought into engagement with the indexing ring by an actuating device fixedly arranged on the machine frame.

In the simplest case, this actuating device is designed as a hydraulic actuating device.

Provision is preferably made for one such actuating device for the means for exact positioning to be associated with each machining station.

In a particularly advantageous combination according to the invention of an indexing detent means and a means for exact positioning, provision is made for the positioning claws to be arranged on the lever carrying the detent nose. This lever is expediently designed such that the detent nose or the positioning claws can be brought into engagement with the indexing ring.

Hence, with hydraulic actuation, it is simultaneously ensured that the indexing detent means is releasable or activatable by the controlled actuation of the positioning claws.

To ensure exact positioning of the holding device relative to the rotary table, provision is advantageously made for the means for exact positioning to be mounted on the rotary table and for merely the actuation to be carried out via the actuating device fixedly arranged on the machine frame.

In like manner, it is advantageous, in particular to maintain detention of the holding device in its individual rotary positions between the machining stations, too, for the indexing detent means to be held on the rotary table.

One embodiment of the inventive machine tool is designed such that the machining stations are arranged at identical angular spacings.

Provision is, furthermore, made for machining devices to be arranged in the machining stations. To bring about exact alignment of the machining devices relative to the respective holding device in the respective machining station, provision is made for the machining devices to be arranged on the machine frame for pivotal motion about an axis of rotation of the holding device standing in the respective machining station.

An independent inventive concept is to be seen in the pivotable arrangement of the machining devices about the axis of rotation of the holding device in the respective machining station in connection with a machine tool of the kind described at the beginning, in particular in connection with the indexing device which enables exact positioning and possibly also prepositioning of the holding device at fixed angular increments. Hence the combination of this indexing device with the pivotably arranged machining devices offers the possibility of adjusting the relative orientation between the machining devices and the holding device in the respective machining station infinitely to any angle between 0 degrees and 360 degrees in a machine tool of the kind described at the beginning.

It is particularly expedient for the machining device to have a work axis which extends parallel to a radial direction in relation to the axis of rotation of the holding device standing in the respective machining station.

In the embodiment of the machine tool which is simplest in this respect, provision is made for the work axis to extend radially in relation to the axis of rotation of the holding device standing in the respective machining station.

In the simplest structural solution of such a pivotable mounting of the machining device, provision is made for the machining device to be held on the machine frame with a rotary bearing arranged coaxially with the axis of rotation of the holding device standing in the respective machining station.

For further supporting of the machining device, it is also advantageous for the latter to be seated on an attachment bed arranged radially outwardly in relation to the rotary table.

The attachment bed preferably comprises a bed plane oriented transversely to the axis of rotation of the holding device standing in the respective machining station.

For attachment of the machining device, provision is, furthermore, made for the attachment bed to comprise adjustable attachment elements for the machining device.

Figure 2:
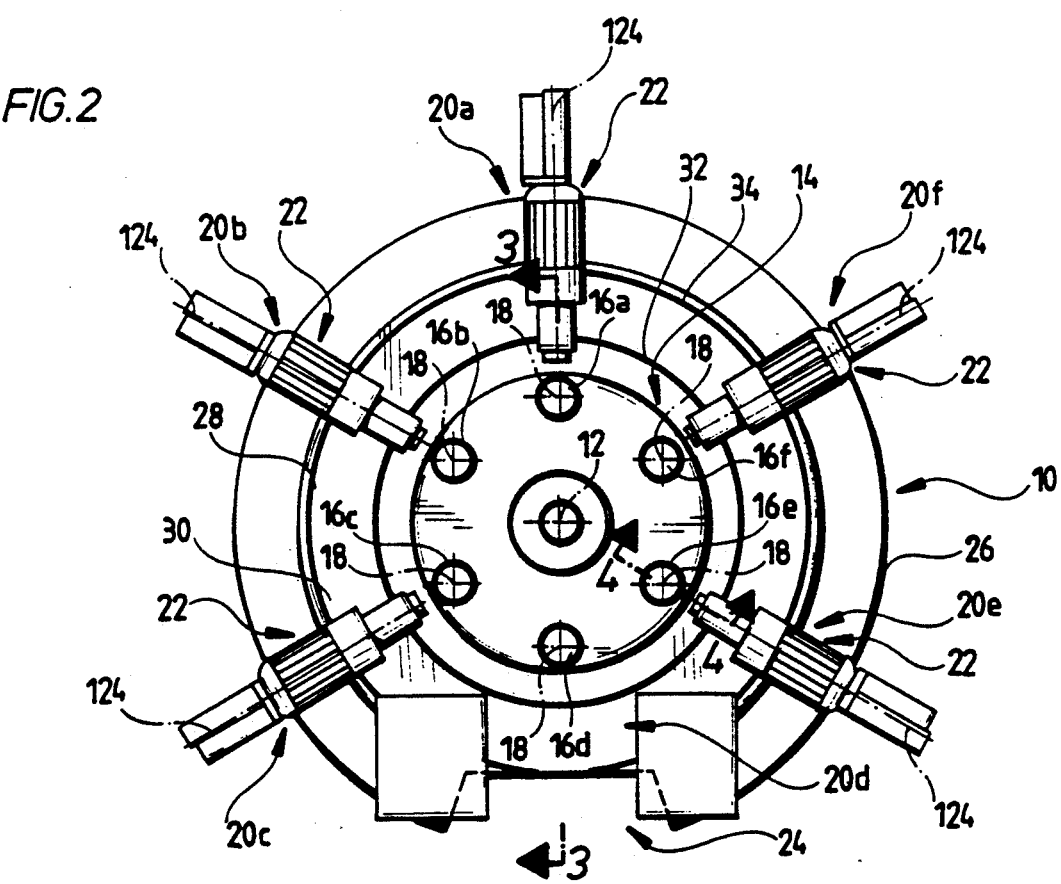
Figure 3:
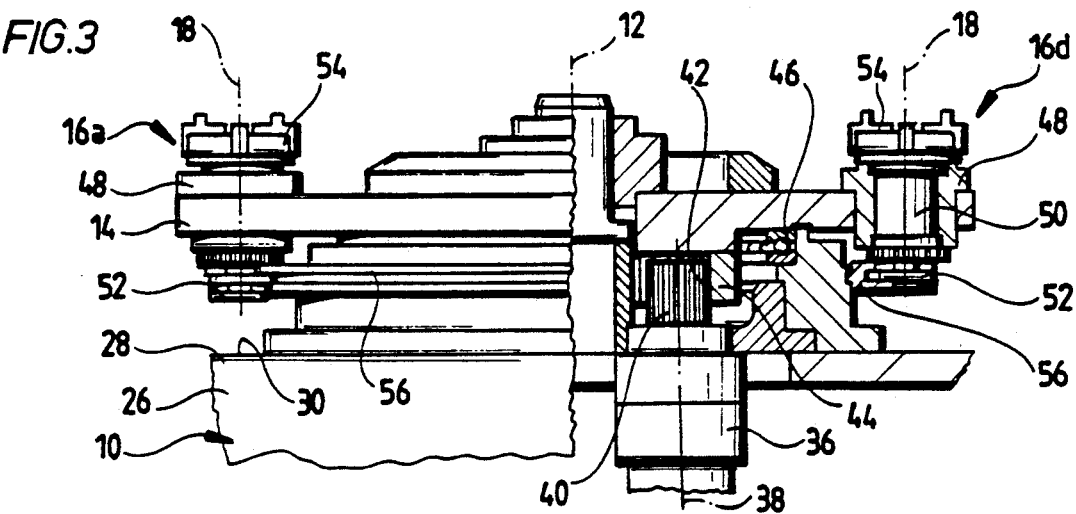
Figure 4:
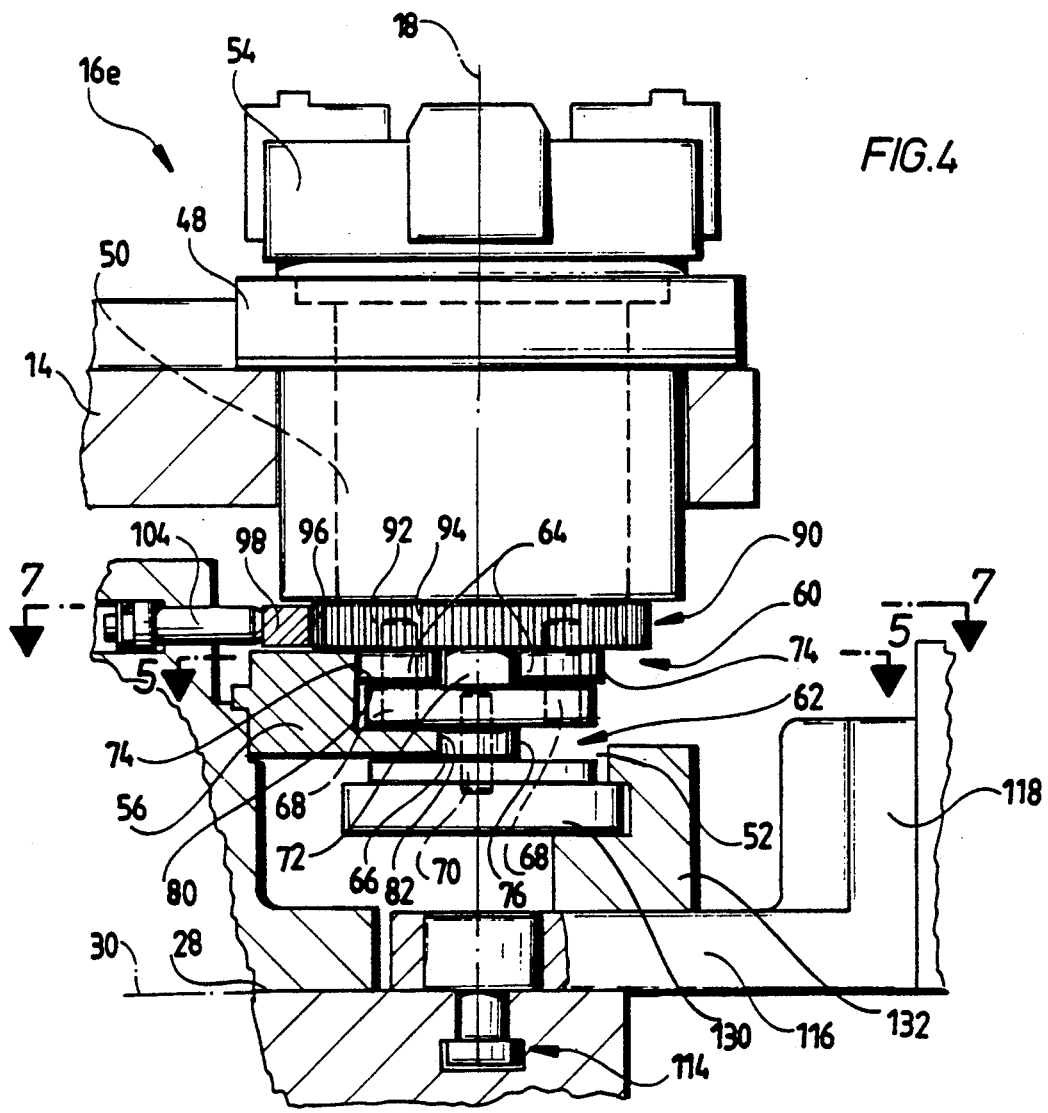

Further features and advantages of the invention are set forth in the following description and the appended drawings of several embodiments which show:

FIG. 1 a front view of an embodiment of a machine tool according to the invention;

FIG. 2 a view from above of the machine tool in FIG. 1;

FIG. 3 a section along line 3—3 in FIG. 2;

FIG. 4 a section along line 4—4 in FIG. 2;

FIG. 5 a section along line 5—5 in FIG. 4, merely illustrating cam tracks and cam elements, in this case a 90 degree rotation;

FIG. 6 a section similar to FIG. 5 for a 360 degree rotation;

FIG. 7 a section along line 7—7 in FIG. 4; and

Figure 8:
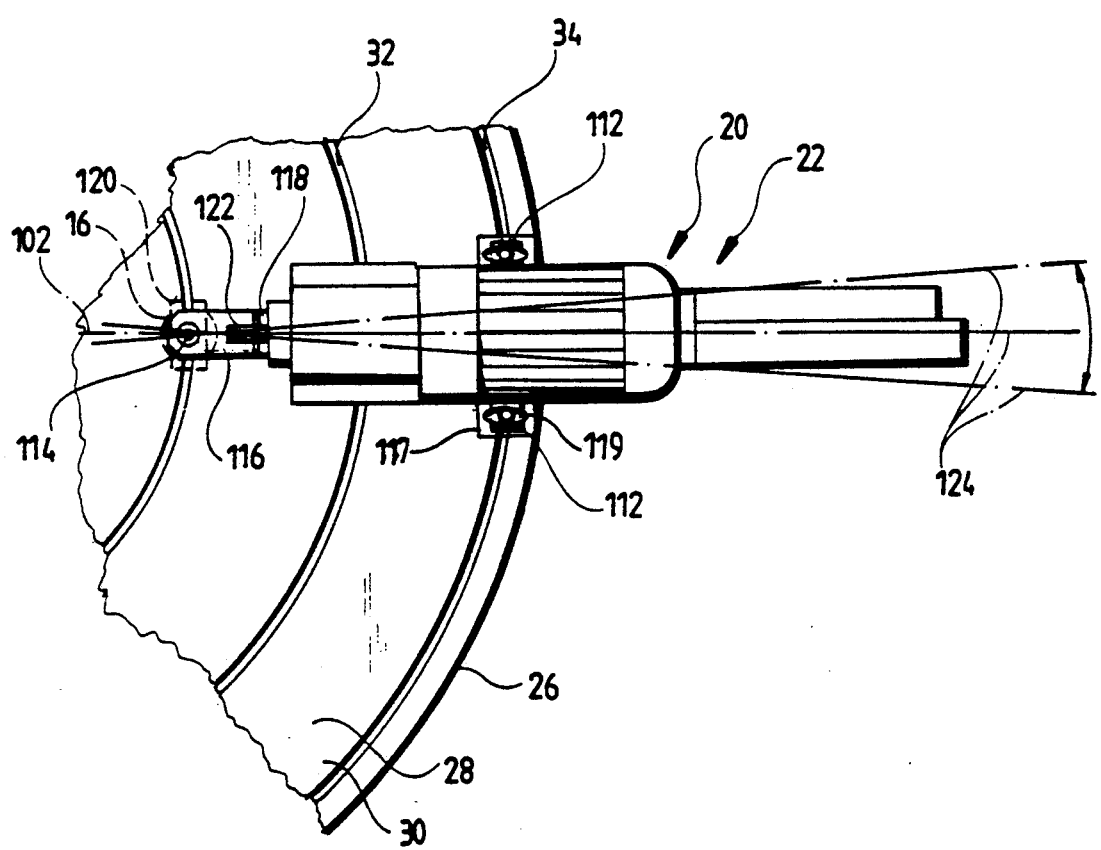

FIG. 8 a partial plan view similar to FIG. 2 with the workpiece holder omitted.

An embodiment of an inventive machine tool, illustrated in FIG. 1, comprises a machine frame 10 on which a rotary table designated in its entirety 14 is mounted for rotation about a center axis 12.

As may be seen, in particular also from FIG. 2, several, in the illustrated embodiment a total of six, workpiece holders 16 are provided as holding devices at identical angular spacings on the rotary table itself. These are each rotatable about an axis of rotation 18 relative to the rotary table 14. The workpiece holders 16 are preferably of identical design and their axis of rotation 18 is arranged concentrically therewith. In addition, all axes of rotation 18 preferably lie at the same radius spacing from the center axis 12 and are arranged at identical angular spacings in relation to the center axis 12.

The workpiece holders 16 can be brought by the rotary table 14 into various machining stations 20a to f which are fixedly arranged relative to the machine frame. To do so, as illustrated by way of example in FIG. 2, the workpiece holder 16a is first positioned in machining station 20a, the workpiece holder 16b in machining station 20b, etc. The rotary table 14 is then rotated by a drive, described hereinbelow, through an angle corresponding to the angular spacing of the workpiece holders 16a, 16b, etc. so that in the next position the workpiece holder 16a is standing in machining station 20b, the workpiece holder 16b in machining station 20c, etc.

In each of these machining stations 20a to f, either a machining device 22 is arranged or provision is made for workpiece feed 24 which, as illustrated in FIG. 2, in the simplest case may be carried out manually or also automatically by corresponding workpiece feeding devices.

To this end, the machining devices 22 are arranged on a substructure 26 extending around the rotary table 14. The substructure 26 is part of the machine frame 10 and forms an attachment bed 28 on which the individual machining devices 22 can be mounted. This attachment bed 28 defines a bed plane 30 which extends transversely to the center axis 12, preferably perpendicularly to the latter, so a defined positioning of all machining devices 22 is possible. To attach the machining devices 22, there extend concentrically with the center axis 12 in the attachment bed 28 T-grooves 32 and 34 in which the machining devices 22 are anchored with corresponding attachment elements, for example, sliding blocks 112.

The rotary table 14 is driven—as illustrated in FIG. 3—by a motor 36 whose motor axis 38 is aligned parallel to the center axis 12 and whose motor shaft is provided with a pinion 40 which engages an internal toothing 42 of an internal gear 44 which is attached to an underside of the rotary table 14. To this end, the motor 36 is held stationarily on the machine frame 10.

The rotary table 14 is mounted on the machine frame 10 via a table bearing 46 which is carried by the machine frame 10 and likewise engages the underside of the rotary table 14 in the region of the internal gear 44.

The workpiece holders 16 are held rotatably in a bushing 48 which is fixedly connected to the rotary table 14 and extends through the latter from its top surface to its underside. The workpiece holders 16 comprise a bearing body 50 which lies in the bushing 48. The bearing body 50 extends through the entire bushing 48 and carries a drive head 52 located underneath the rotary table 14. A clamping head 54 of the workpiece holder 16 provided above the rotary table 14 is similarly carried by the bearing body 50 and is fixedly connected to the latter. Workpieces can be clamped in this clamping head 54 in many different ways, depending on its design. The drive head 52 of the workpiece holder 16 is driven by a driving crown 56 which is held stationarily on the machine frame 10 and extends around the center axis 12. The driving crown 56 is preferably arranged radially externally in relation to the internal gear 44. The drive head 52 and the driving crown 56 together form a rotary drive for the workpiece holder 16.

As may be seen in FIGS. 4 and 5, the drive head 52 comprises a first cam element 60 and a second cam element 62 arranged at a distance below the first cam element 60 in the direction of the axis of rotation 18. Each of the cam elements 60, 62 comprises two rollers 64 and two rollers 66 which are arranged opposite one another at the same radial spacing from the axis of rotation 18. These rollers 64 and 66 together form the first cam element 60 and the second cam element 62, respectively. The rollers 64 and 66 are preferably mounted by bolts 68 and 70, respectively, on a common drive head body 72. The rollers 64 and 66 are rotatable about their respective bolts 68 and 70. The bolts 68 and 70 which define the axes of rotation of the rollers 64 and 66, respectively, extend parallel to the axis of rotation 18 which preferably extends parallel to the center axis 12. The rollers 64 and 66 are of cylindrical design and form with their cylindrical circumferential surface 74 and 76, respectively, first and second cam surfaces which stand parallel to the axis of the bolts 68 and 70, respectively.

The driving crown 56 comprises a first cam track 80 and a second cam track 82. The first cam track 80 cooperates with the first cam element 60 and the second cam track 82 with the second cam element 62. For this reason, the first cam track 80 and the second cam track 82 are spaced from each other in the direction of the axis of rotation by a distance which corresponds to the distance between the first cam element 60 and the second cam element 62. The first and second cam tracks 80 and 82 extend in two planes parallel to each other and each in the radial direction in relation to the center axis 12 and hence also in the direction perpendicular to the axis of rotation 18 of the workpiece holder 16 at a varying radial distance from the axis of rotation 18 and hence also from the center axis 12.

The first and second cam tracks 80 and 82 together form with the first and second cam elements 60 and 62, respectively, the rotary drive for the workpiece holder 16 which establishes a constant transmission ratio between the rotation of the rotary table 14 and the rotation of the workpiece holder 16 and, in addition, holds the workpiece holder 16 in each position along the cam tracks 80 and 82 in a clearly defined rotary position. To this end, the cam elements 60 and 62 are arranged at an offset of 90 degrees in relation to each other on the drive head body 72, i.e., the connecting lines between the bolts 68 and 70 include an angle of 90 degrees with one another. The cam tracks 80 and 82 vary with their radial spacing from the axis of rotation 18 with the same periodicity since the first and second cam elements 60 and 62 are of identical design, but with a phase shift of 180 degrees. Furthermore, the cam tracks 80 and 82 are of such shape that at least always one of the rollers 64 of the first cam element 60 and one of the rollers 66 of the second cam element 62 rests with its cam surface 74 and 76, respectively, against the corresponding cam track 80 and 82, respectively, so the rotary position of the drive head 52 is always held in a defined position by both the first cam element 60 and the second cam element 62 and the corresponding cam tracks 80 and 82, respectively.

The resulting function of the rotary drive is illustrated in FIG. 5 which shows by way of example a section of the cam tracks 80 and 82 as it extends between the machining stations 20a and 20b as well as the corresponding position of the cam elements 60, 62.

In the machining station 20a, the first cam track 80 exhibits the maximum radial spacing from the axis of rotation 18 and hence the first cam element 60 rests with a roller 64 against the first cam track 80, with the connecting line between the bolts 68 of the first cam element 60 standing perpendicularly on the first cam track 80. The second cam element 62 which is turned through 90 degrees in relation to the first cam element 60 is oriented with the connecting axis between the bolts 70 such that this connecting axis stands perpendicularly on the connecting line between the bolts 68. The second cam element 62 rests with both rollers 66 against the second cam track 82 for definite fixing of the rotary position of the drive head 52 as a definite fixing of the rotary position of the drive head 52 would not be possible with the roller 64 resting against the first cam track 80 and one roller 66 resting against the second cam track 82. Hence in the machining position 20a, the second cam track 82 exhibits the smallest radial spacing from the axis of rotation 18 and is of such shape that, as described above, both rollers 66 rest thereon.

From machining position 20a to machining position 20b, the first cam track 80 extends from the maximum radial spacing from the axis of rotation 18 to the minimum radial spacing from the axis of rotation 18 in machining position 20b, and the second cam track 82 from the minimum radial spacing from the axis of rotation 18 in machining position 20a to the maximum radial spacing in machining position 20b.

Hence upon further rotation of the rotary table 14, the drive head 52 and thus also the workpiece holder 16 is turned in the same direction as the direction of rotation of the rotary table 14 through 90 degrees as both rollers 64 now rest on the first cam track 80 in machining position 20b, while only one of the rollers 66 rests on the second cam track 82.

Therefore, when the rotary table 14 is turned through an angle corresponding to the angular spacing between machining position 20a and machining position 20b, the workpiece holder 16 is turned through 90 degrees, from which a constant transmission ratio with which the rotary drive turns the workpiece holder 16 can be calculated.

Hence the cam tracks 80 and 82 are divided into angular segments 84 extending from one machining position 20 to the next machining position 20, and the transmission ratio of the rotary drive may differ in size in each of the angular segments 84.

As an example of this, a further angular segment 84' exhibiting such a transmission ratio is illustrated in FIG. 6. During travel through this angular segment 84', the drive head 52 and hence the workpiece holder 16 are rotated through 360 degrees. This angular segment 84' could, for example, be the angular segment between machining position 20f and machining position 20a. The cam tracks 80 and 82 exhibit in the machining positions 20f and 20a the same radial spacing from the axis of rotation 18, i.e., the cam track 80 exhibits the maximum radial spacing and the cam track 82 the minimum radial spacing, with both rollers 66 of the second cam element 62 resting on the cam track 82 in order to fix a definite position for the drive head 52.

Between these, the first cam track 80 extends as far as to a minimum spacing, a maximum radial spacing thereafter, and then again as far as to a minimum radial spacing from the axis of rotation 18, while the second cam track 82 extends between machining positions 20f and 20a as far as to a maximum radial spacing, to a minimum radial spacing, and again to a maximum radial spacing. In the case of the angular segment 84', too, the cam tracks 80 and 82 are designed such that with minimum radial spacing from the axis of rotation 18, the two rollers 64 and 66, respectively, rest thereon.

In order to fix the workpiece holder 16 in the individual machining positions 20 such that no rotary forces occurring during machining of the workpiece act on the rotary drive, i.e., on the cam elements 60 and 62 and the cam tracks 80 and 82, the drive head 52 is provided with an indexing ring 90 which is arranged above the first cam element 60 and comprises a crown gear 92 with, for example, forty eight teeth 94. One or several teeth 96 of a pivot bar 98 held on the rotary table 14 for pivotal motion about an axis 100 parallel to the axis of rotation 18 can be made to engage these teeth 94 of the crown gear 92. The pivot bar 98 extends on a side of the indexing ring 90 that faces the center axis 12 and carries its teeth 96 preferably at a point of intersection with a connecting line 102 between the axis of rotation 18 and the center axis 12.

An actuating bolt 104 is provided in each machining station 20. This actuating bolt 104 is arranged on the machine frame 10 coaxially with the connecting line 102 between the center axis 12 and the axis of rotation 18 of a workpiece holder 16 standing in this machining station 20 and is movable, for example, hydraulically along this axis. In its retracted position, the actuating bolt 104 allows the pivot bar 98 to pass freely so the teeth 96 of the latter are disengaged from the teeth 94 of the crown gear 92. In its advanced position, however, the actuating bolt 104 presses the teeth 96 into the teeth 94 of the crown gear 92 and hence brings about such fixing of the respective workpiece holder 16 that it absorbs all of the machining forces to be accommodated by it.

The pivot bar 98 is also connected to a detent bar 106 carrying a detent nose 108 which is likewise engageable with the teeth 94 of the crown gear 92. The detent bar 106 preferably extends in a direction approximately perpendicular to the pivot bar 98 and hence approximately radially in relation to the center axis 12 at the side of the indexing ring 90 so the detent nose 108 engages the crown gear 92 in a tangential direction in relation to the center axis 12 approximately at a distance from the center axis 12 which corresponds to the distance of the axis of rotation 18 from the center axis 12. The detent nose 108 is of rounded configuration so it merely prefixes the workpiece holder 16 in the rotary position into which it is brought by the rotary drive comprised of cam elements 60 and 62 and cam tracks 80 and 82.

To keep the detent nose 108 in constant engagement, there is provided in the region of the common rotatable bearing of the pivot bar 98 and the detent bar 106 connected to the latter a spring 110 which is supported on an underside of the rotary table 14 and after winding around the rotatable bearing of the pivot bar 98 and the detent bar 106 on the pivot bar 98 and hence acts upon the pivot bar 98 in the direction towards the center axis 12 and upon the detent bar 106 in the direction towards the crown gear 92 so the detent nose 108 is kept in constant engagement with the crown gear 92 by the action of the spring 110.

Only when the actuating bolt 104 in the respective machining station 20 acts upon the pivot bar 98 and hence brings its teeth 96 into engagement with the teeth 94 of the crown gear 92, is the detent bar with its detent nose 108 pivoted out of engagement with the crown gear 92 so exact positioning of the workpiece holder 16 is only carried out by the teeth 96 of the pivot bar 98.

The fixing of the workpiece holder 16 by means of the indexing ring and the releasing thereof are carried out in cooperation with the rotary drive for the workpiece holder 16 in such a way that when a workpiece holder 16 is standing in a machining station, the workpiece holder 16 is first fully fixed by the pivot bar 98 being acted upon by the actuating bolt 104 in the direction of the crown gear 92. Hence the workpiece holder is capable of absorbing all of the machining forces. Shortly before further rotation of the rotary table, the actuating bolt 104 is moved into its retracted position so the teeth 96 of the pivot bar 98 disengage from the crown gear 92 owing to the action of the spring 110 and the crown gear 92 is merely held in a prefixed manner by the detent nose 108 which again engages the crown gear 92. During further rotation of the rotary table 14, the workpiece holder 16 is rotationally driven by the cam elements 60 and 62 in cooperation with the cam tracks 80 and 82, with the detent nose 108 being pressed out of engagement with the crown gear 92 owing to its shape and the workpiece holder 16, therefore, rotating further in accordance with the angle predetermined by the rotary drive. When the next machining station is reached, the workpiece holder 16 is again fixed exactly by the pivot bar 98, with the detent nose 108 again disengaging from the crown gear 92.

The detent nose 108 serves primarily as prefixing means for the pivot bar 98. In addition, however, provision of the detent nose 108 offers the possibility, when no rotation of the workpiece holder 16 is required from one machining station 20 to the next, for no cam tracks 80 and 82 to be provided in this angular segment 84 so during the rotation of the rotary table through this angular segment, the workpiece holder 16 is only held fixed by the detent nose 108 in cooperation with the crown gear 92.

As may be seen, in particular from FIGS. 4 and 8, the inventive machine tool is also characterized in that the machining device 22 is fixable on the attachment bed 28. This fixing is preferably carried out by sliding blocks which engage T-grooves 32 and 34 and with which attachment elements 112 engaging the machining devices 22 can be fixed.

In addition, each attachment element 112 is fixed with a pivot bolt 114 for pivotal motion on the machine frame 10, the pivot bolt 114 being arranged coaxially with the axis of rotation 18 beneath the drive head 52.

Mounted for rotation on this pivot bolt 114 is a traverse guide 116 which extends from the respective pivot bolt 114 to a carrier unit 118 of the respective machining device 22. The carrier unit 118 is additionally fixable by the attachment elements 112, for example, in the form of sliding blocks on the attachment bed 28. To enable pivotal motion and fixing of the machining device 22 in each pivotal position, the carrier unit 118 is provided with side flanges 117 containing elongate holes 119. The fixing of the carrier unit 118 with the attachment elements 112 on the attachment bed 28 is preferably implemented such that pivotal motion of the machining device 22 through 4 degrees in relation to the respective continuation of the connecting line 102 between the center axis 12 and the axis of rotation 18 standing in the respective machining station is possible.

Owing to the division of the crown gear 92 into forty eight teeth 94, an angle increment of 7.5 degrees is already predetermined by the indexing ring 90. This represents the smallest unit of an angle of rotation through which the workpiece holder is rotatable. In combination with the possibility of also designing the machining device 22 with the attachment elements 112 for pivotal motion through ±4 degrees about the axis of rotation 18, the inventive machine tool offers the possibility of orientating at any angle between 0 degrees and 360 degrees in the respective machining station 20 a workpiece 120 clamped in the workpiece holder 16 and indicated in dashed lines in FIG. 8 relative to a work axis 124 which extends radially in relation to the axis of rotation 18 of the workpiece holder standing in the respective machining station 20 and along which a tool 122 of the respective machining device 22 is movable.

In a further variant of a machining device 22' of the inventive machine tool, the carrier unit 118' is also adapted for pivotal motion in a plane 126 standing perpendicular on the bed plane 30, more particularly, such that the work axis 124' can be pivoted about a center point 128 located in the workpiece 122.

To increase the stability of the support for the workpiece holder 16, the drive head 52 is provided on its underside facing away from the rotary table 14 with a supporting disc 130 which protrudes radially beyond the cam elements 60 and 62 and, insofar as necessary, is supported in the respective machining station 20 by resting on a supporting anvil 132. This supporting anvil 132 can be arranged on the machine frame 10. As illustrated in FIG. 4, it is preferable for the supporting anvil to be arranged so as to rest on the traverse guide 116. When the rotary table is rotated further, the supporting disc 130 leaves the supporting anvil 132 arranged in the previous machining station and on reaching the next machining station enters the supporting anvil 132 arranged therein. Hence additional support is provided for the workpiece holder 16 in the event of large forces acting on the workpiece holder 16 and so even with these large forces, the rotary table 14 is not bent downwards, but instead these very large forces are absorbed by the supporting disc 130 and the supporting anvil 132.

The present disclosure relates to the subject matter disclosed in German application No. P 39 23 230.1 of July 14, 1989, the entire specification of which is incorporated herein by reference.

What is claimed is:

1. A machine tool comprising a machine frame, a rotary table mounted on said machine frame for rotation about a center axis, machining stations arranged at angular spacings around said rotary table, at least one holding device mounted on said rotary table for rotation about an axis of rotation and adapted to be brought into said machining stations by rotation of said rotary table, and a rotary drive for rotating said holding device into various rotary positions, wherein said rotary drive comprises:
   a first and a second single sided cam track held stationarily on said machine frame,
   said first cam track being defined by a first surface and said second cam track being defined by a second surface,
   said first cam track cooperating with a first cam surface of a first cam element mounted on said rotary table and said second cam track cooperating with a second cam surface of a second cam element mounted on said rotary table, wherein said first cam track and first cam surface and said second cam track and second cam surface are, respectively, in constant contact with one another for continuous guidance of the cam surface by the cam track,
   said first and said second cam elements being coupled for rotating said holding device and in each of their positions along said cam tracks holding said holding device in a clearly defined rotary position with said cam elements together contacting said cam tracks in at least two points at all times to limit the free rotation of said cam elements in opposite directions, and
   said cam elements and said cam tracks being arranged such that each cam element has access to its cam track without coming into contact with the cam track of the other cam element or interfering with the other's access to its respective cam track.

2. Machine tool as defined in claim 1, characterized in that said first and second surfaces extend parallel to each other.

3. Machine tool as defined in claim 1, characterized in that said first and second cam elements rotate about axes standing perpendicularly on said first and second surfaces, respectively.

4. Machine tool as defined in claim 3, characterized in that said axis is a multiple rotational symmetry axis for said respective cam element.

5. Machine tool as defined in claim 4, characterized in that said axis is a twofold rotational symmetry axis for said respective cam element.

6. Machine tool as defined in claim 4, characterized in that said first and second cam elements exhibit identical symmetry characteristics.

7. Machine tool as defined in claim 1, characterized in that said cam elements are seated on one drive part only of said rotary drive.

8. Machine tool as defined in claim 7, characterized in that said cam elements are arranged in spaced relation to each other in the axial direction of said drive part.

9. Machine tool as defined in claim 7, characterized in that said cam elements are held in offset relation to each other on said drive part.

10. Machine tool as defined in claim 1, characterized in that said cam elements run with rollers on said cam tracks respectively associated therewith.

11. Machine tool as defined in claim 1, characterized in that said cam tracks extend concentrically about said center axis.

12. Machine tool as defined in claim 1, characterized in that said cam tracks are divided up into angular segments extending from one machining station to the next machining station.

13. Machine tool as defined in claim 12, characterized in that while travelling through different angular segments, said cam elements rotate said holding device through different angles of rotation.

14. Machine tool as defined in claim 12, characterized in that while travelling through an angular segment, said cam elements rotate said holding device through an n-th multiple of an angular increment.

15. Machine tool as defined in claim 12, characterized in that said cam tracks are designed such that said cam elements rotate said holding device during the entire travel through an angular segment.

16. Machine tool as defined in claim 15, characterized in that during travel through each angular segment, said rotary drive establishes a constant transmission ratio between a rotation of said rotary table and of said holding device.

17. Machine tool as defined in claim 1, characterized in that said cam elements are designed such that with correspondingly designed cam tracks rotation of said holding device is possible within the range of from 0 degrees to at least 360 degrees.

18. Machine tool as defined in claim 1, characterized in that said cam tracks are held exchangeably on said machine frame.

19. Machine tool as defined in claim 18, characterized in that said first and second cam tracks are held individually on said machine frame.

20. Machine tool as defined in claim 18, characterized in that said cam tracks are divided up into track segments corresponding to said angular segments.

21. Machine tool as defined in claim 1, characterized in that said holding device is provided with an indexing device.

22. Machine tool as defined in claim 21, characterized in that said indexing device comprises an indexing ring which is rotationally fixedly connected to said holding device and cooperates with an indexing detent means held on said rotary table.

23. Machine tool as defined in claim 22, characterized in that said indexing detent means is a lever with a detent nose acted upon by a spring for engagement in said indexing ring.

24. Machine tool as defined in claim 23, characterized in that said detent nose prefixes said holding device.

25. Machine tool as defined in claim 21, characterized in that said indexing device comprises a means for exact positioning of said holding device in said machining stations.

26. Machine tool as defined in claim 25, characterized in that said means for exact positioning comprises positioning claws which can be brought into engagement with said indexing ring.

27. Machine tool as defined in claim 26, characterized in that said positioning claws can be brought into engagement with said indexing ring in a machine-controlled manner.

28. Machine tool as defined in claim 27, characterized in that said positioning claws can be brought into engagement with said indexing ring by an actuating device fixedly arranged on said machine frame.

29. Machine tool as defined in claim 28, characterized in that an actuating device for said means for exact positioning is associated with each machining station.

30. Machine tool as defined in claim 26, characterized in that said positioning claws are arranged on said lever carrying said detent nose.

31. Machine tool as defined in claim 26, characterized in that either said detent nose or said positioning claws can be brought into engagement with said indexing ring.

32. Machine tool as defined in claim 1, characterized in that machining devices are arranged in said machining stations.

33. Machine tool as defined in claim 32, characterized in that said machining devices are arranged on said machine frame for pivotal motion about said axis of rotation of said holding device standing in said respective machining station.

34. Machine tool as defined in claim 33, characterized in that said machining device comprises a work axis which extends parallel to a radial direction in relation to said axis of rotation of said holding device standing in said respective machining station.

35. Machine tool as defined in claim 34, characterized in that said work axis extends radially in relation to said axis of rotation of said holding device standing in said respective machining station.

36. Machine tool as defined in claim 33, characterized in that said machining device is held on said machine frame with a rotary bearing arranged coaxially with said axis of rotation of said holding device standing in said respective machining station.

37. Machine tool as defined in claim 32, characterized in that said machining device is seated on an attachment bed arranged radially outwardly in relation to said rotary table.

38. Machine tool as defined in claim 37, characterized in that said attachment bed comprises a bed plane aligned transversely to said axis of rotation of said holding device standing in said respective machining station.

* * * * *